(12) United States Patent
Akirav et al.

(10) Patent No.: US 8,391,140 B2
(45) Date of Patent: *Mar. 5, 2013

(54) DEDUPLICATED DATA PROCESSING RATE CONTROL

(75) Inventors: Shay H. Akirav, Tel Aviv (IL); Ron Asher, Tel Aviv (IL); Yariv Bachar, Tel Aviv (IL); Lior Klipper, Tel Aviv (IL); Oded Sonin, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,772

(22) Filed: Apr. 27, 2012

(65) Prior Publication Data

US 2012/0215748 A1  Aug. 23, 2012

Related U.S. Application Data

(63) Continuation of application No. 12/539,085, filed on Aug. 11, 2009.

(51) Int. Cl.
*H04L 1/00* (2006.01)

(52) U.S. Cl. .................................................. 370/229

(58) Field of Classification Search .................. None
See application file for complete search history.

(56) References Cited

U.S. PATENT DOCUMENTS

| | | | |
|---|---|---|---|
| 5,583,995 A | 12/1996 | Gardner et al. | |
| 5,870,759 A | 2/1999 | Bauer et al. | |
| 6,889,297 B2 | 5/2005 | Krapp et al. | |
| 7,539,710 B1 | 5/2009 | Haustein et al. | |
| 8,095,756 B1* | 1/2012 | Somavarapu et al. | 711/162 |
| 8,204,868 B1* | 6/2012 | Wu et al. | 707/693 |
| 2005/0021931 A1* | 1/2005 | Anderson et al. | 712/220 |
| 2007/0226413 A1 | 9/2007 | Elliott et al. | |
| 2007/0276833 A1 | 11/2007 | Sen et al. | |
| 2008/0005201 A1 | 1/2008 | Ting et al. | |
| 2008/0013830 A1 | 1/2008 | Patterson et al. | |
| 2008/0263109 A1 | 10/2008 | Patterson | |
| 2008/0288482 A1 | 11/2008 | Chaudhuri et al. | |
| 2009/0106578 A1 | 4/2009 | Dilman et al. | |
| 2009/0132534 A1 | 5/2009 | Yao et al. | |
| 2009/0132619 A1 | 5/2009 | Arakawa et al. | |
| 2009/0182986 A1* | 7/2009 | Schwinn et al. | 712/214 |
| 2010/0070715 A1* | 3/2010 | Waltermann et al. | 711/129 |
| 2010/0070725 A1* | 3/2010 | Prahlad et al. | 711/162 |
| 2010/0114833 A1* | 5/2010 | Mu | 707/650 |
| 2010/0211616 A1* | 8/2010 | Khandelwal et al. | 707/812 |

OTHER PUBLICATIONS

Rinard et al., "Eliminating Synchronization Bottlenecks Using Adaptive Replication", ACM Digital Library, vol. 25, No. 3; May 2003, pp. 316-359.

(Continued)

*Primary Examiner* — Jacob A Petranek
(74) *Attorney, Agent, or Firm* — Griffiths & Seaton PLLC

(57) ABSTRACT

A plurality of workers is configured for parallel processing of deduplicated data entities in a plurality of chunks. The deduplicated data processing rate is regulated using a rate control mechanism. The rate control mechanism incorporates a debt/credit algorithm specifying which of the plurality of workers processing the deduplicated data entities must wait for each of a plurality of calculated required sleep times. The rate control mechanism is adapted to limit a data flow rate based on a penalty acquired during a last processing of one of the plurality of chunks in a retroactive manner, and further adapted to operate on at least one vector representation of at least one limit specification to accommodate a variety of available dimensions corresponding to the at least one limit specification.

11 Claims, 6 Drawing Sheets

OTHER PUBLICATIONS

Rinard et al., "Eliminating Synchronization Bottlenecks in Object-Based Programs Using Adaptive Replication", ACM Library, 1999, pp. 83-94.

Choi et al., "A General Framework for Prefetch Scheduling in Linked Data Structures and Its Application . . . " ACM Library, vol. 22, No. 2, May 2004, pp. 214-280.

Litwin et al., "LH—A Highly-Available Scalable Distributed Data Structure", ACM Library, vol. 30, No. 3, Sep. 2005, pp. 769-811.

Jesus Luna et al., "An Analysis of Security Services in Grid Storage Systems," CoreGRID Technical Report, No. TR-0090, Aug. 31, 2007, pp. 1-22.

* cited by examiner

```
1   ReportAndAdjust($\vec{M}$ sample)
2   {
3      Init:   maxSleepTime = $S$; lastUpdateTime = $t_0$; debt = $D$;
4              $\vec{M}$ limitsPerTime = $L$; $\vec{M}$ maxDebt = $A$;
5   {
6      // Calculate elapsed time & Update last update time
7      Time   updateTime   = GetCurrentTime();
8      Time   elapsedTime  = updateTime - lastUpdateTime;
9      lastUpdateTime      = updateTime;
10
11     // Update new credit accumulated in the elapsed time:
12     $\vec{M}$   limitsPerTime = GetCurrentRateLimitsPerTime();
13     $\vec{M}$   elapsedCredit = elapsedTime × limitsPerTime;
14
15     // Add the sample to the current debt & subtract the new elapsed credit
16     debt = debt + sample - elapsedCredit;
17
18     // Check if we need to sleep
19     sleepTime = 0;
20     $\vec{M}$   delta = debt - maxDebt;
21     if ( delta ≠ $\vec{0}$ ) {
22        // Calculate how much to sleep
23        requiredSleepTime = 0;
24        for each i from 0...$\|\vec{M}\|$ , do
25           measurementSleepTime = $delta_i$ / $limitsPerTime_i$;
26           requiredSleepTime = MAX(measurementSleepTime, requiredSleepTime);
27        end
28        // Sleep no more than the maximum sleep time
29        sleepTime = MIN(requiredSleepTime, maxSleepTime);
30        :
31     }
32     SLEEP(sleepTime);
33  }
```

FIG. 6

DEDUPLICATED DATA PROCESSING RATE CONTROL

CROSS-REFERENCE TO RELATED APPLICATIONS

The present application is a Continuation of U.S. application Ser. No. 12/539,085, filed Aug. 11, 2009, which is related to U.S. application Ser. No. 12/539,066, entitled "SYNCHRONIZATION OF REPLICATED SEQUENTIAL ACCESS STORAGE COMPONENTS," having filed concurrently therewith and U.S. application Ser. No. 12/539,109, entitled "REPLICATION OF DEDUPLICATED DATA," having filed concurrently therewith; all of which are incorporated herein by reference.

BACKGROUND OF THE INVENTION

1. Field of the Invention

The present invention relates in general to computers, and more particularly to apparatus, method and computer program product embodiments for deduplicated data processing rate control in a computing storage environment.

2. Description of the Related Art

Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and increased network bandwidth. Due to these and other benefits, deduplication has emerged in recent years as a highly important technological field in computing storage systems. Challenges to providing deduplication functionality include aspects such as efficiently finding duplicated data patterns in typically large storage repositories, and storing the data patterns in a deduplicated storage-efficient form.

SUMMARY OF THE INVENTION

Deduplication systems may externalize various logical data storage entities, such as files, data objects, backup images, data snapshots or virtual tape cartridges. Moreover, there are further applications to deduplicated data transfer, and in general, data processing, which are local to a deduplicated storage system. It is often required that such data storage entities be electronically transferred (e.g., replicated) from their origin site to remote sites. Replicated data entities enhance fault tolerance abilities, disaster recovery, and availability of data. Such fault tolerance and high availability is increasingly demanded. Deduplicated data entities might become obsolete or fragmented over time. This means that the deduplicated storage systems might need to manipulate them, such as delete or compact (defragment) them to rearrange the physical storage space on which they reside.

To enhance accessibility to data, disaster recovery, and fault tolerance capabilities, it may be required that the various types of processing of deduplicated data entities residing in deduplicated storage systems must be able to control their data flow rate in order not to impact other mission critical procedures (e.g., backup, restore and recovery). In addition, pursuant to such a need, such systems may benefit from a reduction in bandwidth consumption over the communication lines interconnected between the described systems, thus providing an additional motivation for such rate control. While a variety of rate limitation approaches are currently available, these approaches are accompanied by requirements negatively affecting factors such as efficiency and system compatibility as will be further described.

In view of the foregoing, a need exists for a mechanism providing deduplicated data processing rate control in a manner enhancing system efficiency and compatibility, among other factors. Accordingly, various embodiments for deduplicated data processing rate control are provided. In one such embodiment, by way of example only, a method for deduplicated data processing rate control using at least one processor device in a computing environment is provided. A set of workers is configured for parallel processing of deduplicated data entities in a number of chunks. The deduplicated data processing rate is regulated using a rate control mechanism. The rate control mechanism incorporates a debt/credit algorithm specifying which of the set of workers processing the deduplicated data entities must wait for concurrent calculated required sleep times. The rate control mechanism is adapted to limit a data flow rate based on a penalty acquired during a last processing of one of the plurality of chunks in a retroactive manner. The rate control mechanism is further adapted to operate on one or more vector representations of one or more limit specifications in order to accommodate a variety of available dimensions corresponding to the limit specifications.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 6 illustrates pseudo code for an exemplary method for deduplicated data processing rate control.

DETAILED DESCRIPTION OF THE DRAWINGS

Figure 1:
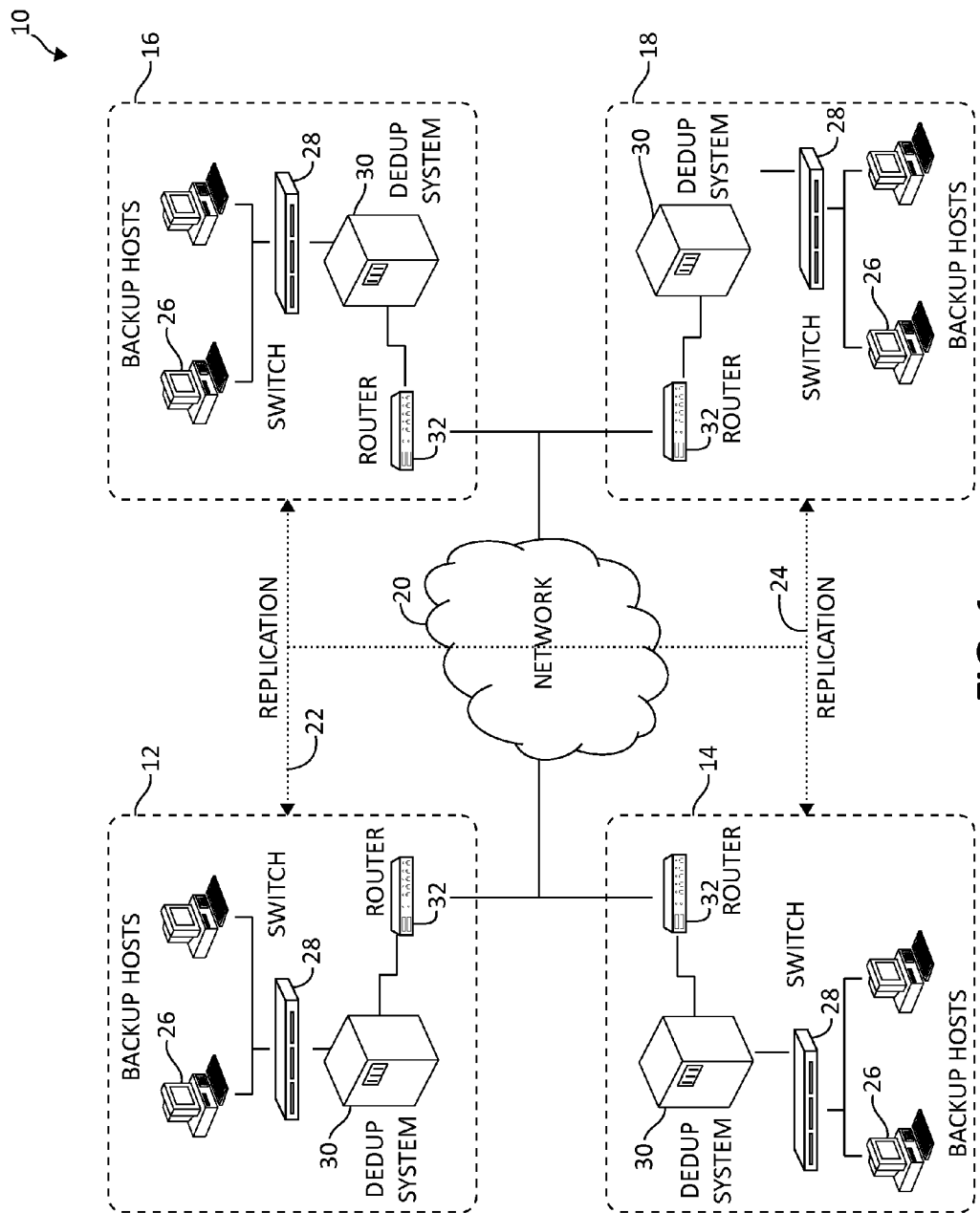
FIG. 1 illustrates an exemplary computing environment in which aspects of the present invention may be implemented.

Turning now to FIG. 1, exemplary architecture 10 of deduplication systems and related components in a computing storage environment is depicted. Architecture 10 provides storage services to several backup hosts 26. Deduplicated data replication is provided between various deduplication system groups 12, 14, 16, and 18 as indicated by dashed lines 22 and 24. Each of groups 12, 14, 16, and 18 include one or more hosts 26, which are connected to a deduplication system 30 via networking components such as a switch 28 as indicated. Deduplication systems 30 are interconnected via networking components such as a router 32, which provides internetwork connectivity between groups 12, 14, 16, and 18.

A network 20 connects such deduplication systems 30 and routers 32. Network 20 may, in one embodiment, include a wide area network (WAN). In other embodiments, network 20 may include local area networks (LANs), storage area networks (SANs), and other network topologies known to the skilled artisan. While routers 32 and switches 28 are shown, the skilled artisan will also appreciate that additional and/or substitute networking components are contemplated.

In one embodiment, switch 28 is compliant with a fibre channel network protocol, making the switch 28 and interconnected components capable of executing commands such as small computer systems interface (SCSI) commands. Such commands may be executed for a variety of storage devices, again as the skilled artisan will appreciate, such as disk drives, tape devices, solid state devices (SSDs), and the like. While the architecture 10 provides one example of components that may be utilized to implement various facets of the present invention and claimed subject matter, the skilled artisan will appreciate that other such architectures are contemplated.

An efficient deduplicated data processing rate control mechanism satisfies the following considerations. First, the mechanism enables rate control over multiple dimension limits simultaneously. In other words, rate control should be able to take into account multiple limits simultaneously. Secondly, the mechanism enables rate control over virtual dimension limits, and not necessarily physical measurements. This means that some of the limits that the rate control should consider are not physically measured but software figures of merit computed during system operation. Third, the mechanism supports parallel and/or distributed processing environments. Fourth, the operating environment may change online, i.e. limits can change dynamically based on system operation and/or external input. Finally, the mechanism should be independent of storage systems layout, hardware specifications, and latency and bandwidth considerations.

There are several approaches for data-flow rate control, which may be used to design and implement rate control mechanisms for deduplication storage systems. Mostly, these approaches were developed in the context of computer networking domain, and are usually referred to as traffic shaping methods or data-flow rate limiting. In particular, traffic shaping is any method on a data stream of packets that imposes additional delay on the data stream of packets such that they conform to some predetermined constraint.

One classification of rate control methods is "collaborative methods", in which the data load generated by a sender is modified in accordance with congestion information returned from the receiver. However, such an approach cannot be employed when trying to control the deduplicated data processing rate at a single system (sender or receiver) on a standalone basis, since each system has its own workload and critical procedures running on it that add constraints to the data-flow rate control. Furthermore, these methods depend heavily on the specific properties of the network connection (or of the hardware in general), making them non-compliant with other environments. This collaborative approach is opposed to self-limiting source control, which produces traffic (or load) that never exceeds some upper bound constraint.

Other approaches include the class of so-called "bucket" algorithms (e.g., leaky-bucket and token-bucket). They differ in that leaky bucket algorithms impose hard limits on the data flow rate, whereas token bucket algorithms allow a certain amount of bursts while imposing limits on the average data flow rate. The bucket is an abstract container holding aggregate traffic to process, represented as tokens of predetermined resolution (e.g., packets and byte chunks). When the algorithm processes traffic, tokens are removed from the bucket. The tokens are a direct transformation of the traffic. In other words, there is a trivial function that translates the traffic processed to the number of tokens it represents. When there are no tokens in the bucket, a flow cannot transmit the packets. Thus, a flow can transmit traffic up to the peak burst rate if there are enough tokens present. In the leaky variation, when packets arrive, they are placed as translated tokens in the bucket. If the bucket is full, they are discarded. Traffic in the bucket is sent at a constant rate, equivalent to bandwidth of the hole in the leaky bucket. These approaches guarantee rate limiting with hard limits or average as stated, and are indeed considered standards.

The use of bucket algorithms in rate control mechanisms has accompanying limitations, however. For example, token bucket algorithms typically consider a single type of token, and thus a single type of limit (e.g. packets/sec, Bytes/sec). Moreover, these algorithms require a direct translation of the data processed chunks to tokens of predefined resolution. This approach may not be workable in the context of data chunks stored in deduplicated efficient form, since the processing system cannot know the actual token physical penalty of a chunk until it has already processed it. Trying to approximate a deduplicated data chunk's token translation may lead to negative effects in the rate control. More efficient would be a mechanism that accommodates multiple types of rate limits together with the ability to cope with deduplicated data forms, not trivially translatable to direct physical tokens or measurements.

The illustrated embodiments provide a novel approach for deduplicated data processing rate control, satisfying all of the considerations for efficient deduplicated rate control described previously. In one such embodiment, mechanisms are optimized to control the data flow rate over multiple and/or virtual dimension limits within a parallel application environment, accept online limits changes, and are independent of the deduplicated storage systems' layout, hardware or network specification.

Throughout the following description and claimed subject matter, the following terminology, pertaining to the illustrated embodiments, is described. A "worker" is intended to refer to the parallel entity of the deduplicated data processing procedure or algorithm, designed to process deduplicated data entities or objects. The workers process the deduplicated data entity in "chunks." Accordingly, a "chunk" is intended to refer to a portion of the deduplicated data entity. In the event that the deduplicated data processing involves replication of the deduplicated data (or some other electronic data transfer), a single data entity may include at least two peer workers processing the entity (one at each deduplication system, local and remote). In other deduplication data processing cases (e.g., deletion or defragmentation), single or multiple workers may be assigned to and process a single data entity. The skilled artisan will appreciate that the configuration of workers assigned to a particular data entity or entities may vary according to a particular implementation.

As will be seen, following, each worker operational in one or more deduplication systems utilize mechanisms of the illustrated embodiments to adjust their respective data flow processing according to the current rate limits set by the mechanisms. The workers do so by reporting to the mechanisms after each processing of a data chunk (whether incoming or outgoing) and in place adjust themselves according to the correct feedback from the mechanisms. This mutual feedback facilitates rate control of a parallel/distributed processing environment, since all the workers are processing in parallel and affect each other under these mechanisms.

Moreover, since the adjustments are done for every chunk, the workers quickly adapt to online change of rate limits.

The mechanisms of the illustrated embodiments regulate the deduplicated data processing rate using a retroactive debt/credit algorithm, which dictates when the worker running the process must wait and for how long. The debt/credit algorithm is retroactive in the sense that it limits the data-flow rate based on the penalty (debt) acquired during the last processing of a chunk. Retroactivity characteristics of the debt/credit algorithm distinguishes the mechanisms of the illustrated embodiments from other rate limit control mechanisms, often implemented in computer networking domain, which limit or delay the processing of the current chunk before it is actually processed. However, in deduplicated data processing of any application, the actual processed segments penalty is usually not known in advance, due to the deduplicated form, which makes other rate limit control mechanisms inapplicable. In effect, this attribute enables rate control over virtual dimension limits. Moreover, it separates the mechanism from being dependant on the physical structure, layout or hardware specification, since the rate is controlled in non-physical, indirect layer of measurement abstraction.

Figure 2:
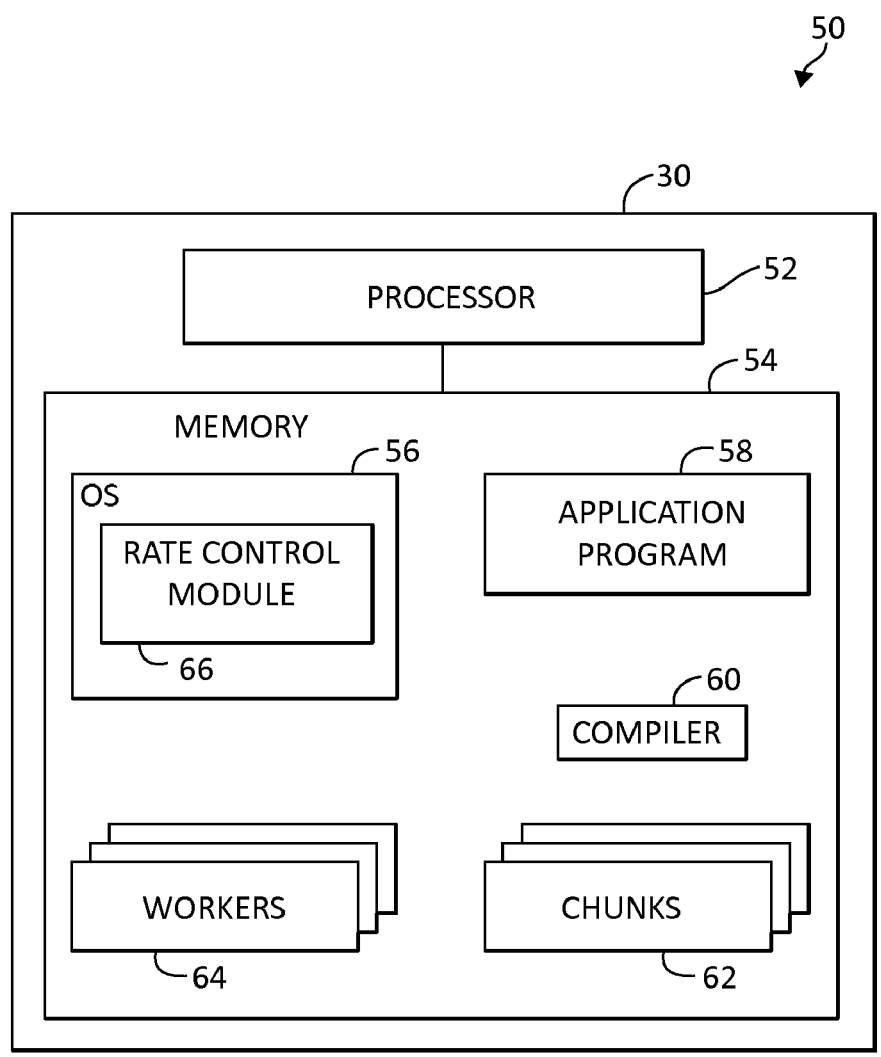
FIG. 2 illustrates an exemplary portion of a deduplication system as illustrated in FIG. 1, previously, including a processor device.

Turning now to FIG. 2, an exemplary portion 50 of a deduplication system 30 as also seen in FIG. 1, previously, is illustrated. Portion 50 of deduplication 30 is operable in a computer environment as a portion thereof, in which mechanisms of the following illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

Deduplication system 30 includes a processor 52 and a memory 54, such as random access memory (RAM). The deduplication system 30 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the deduplication system 30.

In the illustrated embodiment, the deduplication system 30 operates under control of an operating system (OS) 56 (e.g. z/OS, OS/2, LINUX, UNIX, WINDOWS, MAC OS) stored in the memory 54, and interfaces with the user to accept inputs and commands and to present results. In one embodiment of the present invention, the OS 56 facilitates rate control mechanisms according to the present invention. To this end, OS 56 includes a rate control module 66 which may be adapted for carrying out various processes and mechanisms in the exemplary methods described following.

The deduplication system 30 may implement a compiler 60 that allows an application program 58 written in a programming language such as COBOL, PL/1, C, C++, JAVA, ADA, BASIC, VISUAL BASIC or any other programming language to be translated into code that is readable by the processor 52. After completion, the computer program 58 accesses and manipulates data stored in the memory 56 of the system 30 using the relationships and logic that was generated using the compiler 60.

To further implement and execute mechanisms and processes according to the present invention, OS 56, in conjunction with memory 54, processor 52, program 58, and other computer processing, networking, and storage components, may implement workers 64 as previously described processing chunks 62 of deduplicated data. As the skilled artisan will appreciate, the mechanisms of workers 64 and chunks 62 as presently illustrated may be implemented in various forms and architectures. Accordingly, the illustration of workers 64 and chunks 62 in the present figure is again intended to demonstrate logical relationships between possible computing components in the deduplication system 30, and not to imply a specific physical structure or relationship.

In one embodiment, instructions implementing the operating system 56, the computer program 58, and the compiler 60, as well as the workers 64 and chunks 62 are tangibly embodied in a computer-readable medium, which may include one or more fixed or removable data storage devices, such as a zip drive, disk, hard drive, DVD/CD-ROM, digital tape, SSDs, etc. Further, the operating system 56 and the computer program 58 comprise instructions which, when read and executed by the system 30, cause the system 30 to perform the steps necessary to implement and/or use the present invention. Computer program 58 and/or operating system 56 instructions may also be tangibly embodied in the memory 56 and/or transmitted through or accessed by network 20 via various components (e.g., router 32, FIG. 1). As such, the terms "article of manufacture," "program storage device" and "computer program product" as may be used herein are intended to encompass a computer program accessible and/or operable from any computer readable device or media.

Embodiments of the present invention may include one or more associated software application programs 58 that include, for example, functions for managing a distributed computer system comprising a network of computing devices, such as a storage area network (SAN). Accordingly, processor 52 may comprise one or more storage management processors (SMP). The program 58 may operate within a single computer and/or deduplication system 30 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other).

The mechanisms of the illustrated embodiments may be adapted to simultaneously accommodate a variety of limit specifications of various dimensions and types, which have one common attribute in that they are all measured in time. Each measurement is determined by its respective limit (e.g., bytes processed are determined by B/sec limit). Also, the measurements are translated to their respective debt (or credit) and the algorithm normalizes the whole vector of debts to a single delay time parameter. Whenever a particular chunk reported by a single worker creates too much debt (regardless which measure created the debt), the worker abstains from further processing according to the calculated delay time.

In one of the illustrated embodiments, the various limit types are credited within each time unit (e.g. second). An abstract "bank account" cannot accumulate credit. In other words, the new credit must be spent immediately to cover the debt accumulated due to the workers' processing. There is a maximum debt allowed; if the maximum debt is reached the workers are held until enough credit is accumulated to cover the deviation from the maximum. Practically, the credits may be calculated when the worker reports in, based on the previous debts and the time elapsed.

As a result, the mechanisms of the present invention enable to achieve highly efficient deduplicated data processing, addressing the various considerations for deduplicated data processing rate efficiency described previously. For example, as an initial matter, the deduplicated data processing rate of the illustrated embodiments may be controlled over various dimensions within every calculation unit simultaneously. The deduplicated data processing rate may be controlled over virtual layer dimensions, i.e., dimensions that cannot be translated to a physical measurement using a simple function due to deduplication. The mechanisms of the illustrated embodiments operate in a parallel processing environment that may be extended to a distributed environment. The deduplicated data processing rate control may be adaptive to online (dynamic) change. The limits can change during the deduplicated data processing procedure given altering effects in the environment. Finally, the mechanisms' retroactive attributes enable the mechanisms to retain independence to a particular storage layout, hardware specification, and latency and bandwidth requirements.

As mentioned briefly above, the illustrated embodiments are adapted to simultaneously accommodate a vector of limit specifications of various dimensions and types within each calculation step. Again, these various dimensional limits share a common attribute, as they are all defined per time units. In order to facilitate such accommodation, several constants and vectored types may be defined together with the operations permitted on them, as will be now described.

As an initial matter, a vector $\vec{M}$ may be defined to represent the various dimensions corresponding to the various limits. This vector's length is $|\vec{M}|$. The $\vec{M}$ vector is utilized for several uses in the mechanisms of the illustrated embodiments. For example, the workers use $\vec{M}$ to report their sample of the various dimensions' values after processing each chunk of the deduplicated data. Additionally, the vector is used to hold the current debt (inversed credit) accumulated during the runtime of the mechanisms. Moreover, the vector is further used to calculate the automatic elapsed credit gained since the last worker update, (e.g., report).

Another use of $\vec{M}$ vector is to serve the algorithm in defining the maximum debt to be accumulated during operation of the mechanisms. This max debt concept defines the cutoff vector values, which, in case the debt values exceed them (at least one value), the mechanisms adjust the data processing rate by instructing the worker causing the excess to delay itself, and by this adapt to the specified limits. In effect, the max debt vector behaves as a virtual window of measurement, (i.e., the smaller the window is, the more sensitive it is to change). In addition, $\vec{M}$ is used to define a limits-per-time unit vector. The limits are defined per a unified time unit common to all dimensions for simplicity. A $\vec{0}$ constant vector with zero values is also defined and used to evaluate non-zero delta values.

The vector operations on $\vec{M}$ vectors, which facilitate the algorithm: addition, subtraction, equality, assignment, and setting of a single dimension element, are defined as standard mathematical notation for vector operations, except for subtraction, which is defined to reset a dimension to zero value, when it is subtracted below zero, since all types are non-negative. Given limits per time unit vector and an elapsed time measurement, one can calculate a corresponding elapsed credit vector using scalar-vector multiplication. This is useful to the exact calculation of the debt vector within each worker's report.

Given some $\vec{M}$ x and limits per time unit vectors, one can calculate the maximum delay time needed to clear x under the limits vector. This step is necessary to determine the required delay time for the worker due to the leftover debt vector within each worker's report. Since all limit dimensions are assumed to be dependent on time units, the mechanisms use a Sleep( ) function in order to delay the workers at runtime. Note that whenever the worker delays its execution using this function, its rate is effectively reduced so as the whole system's overall rate.

Figure 3:
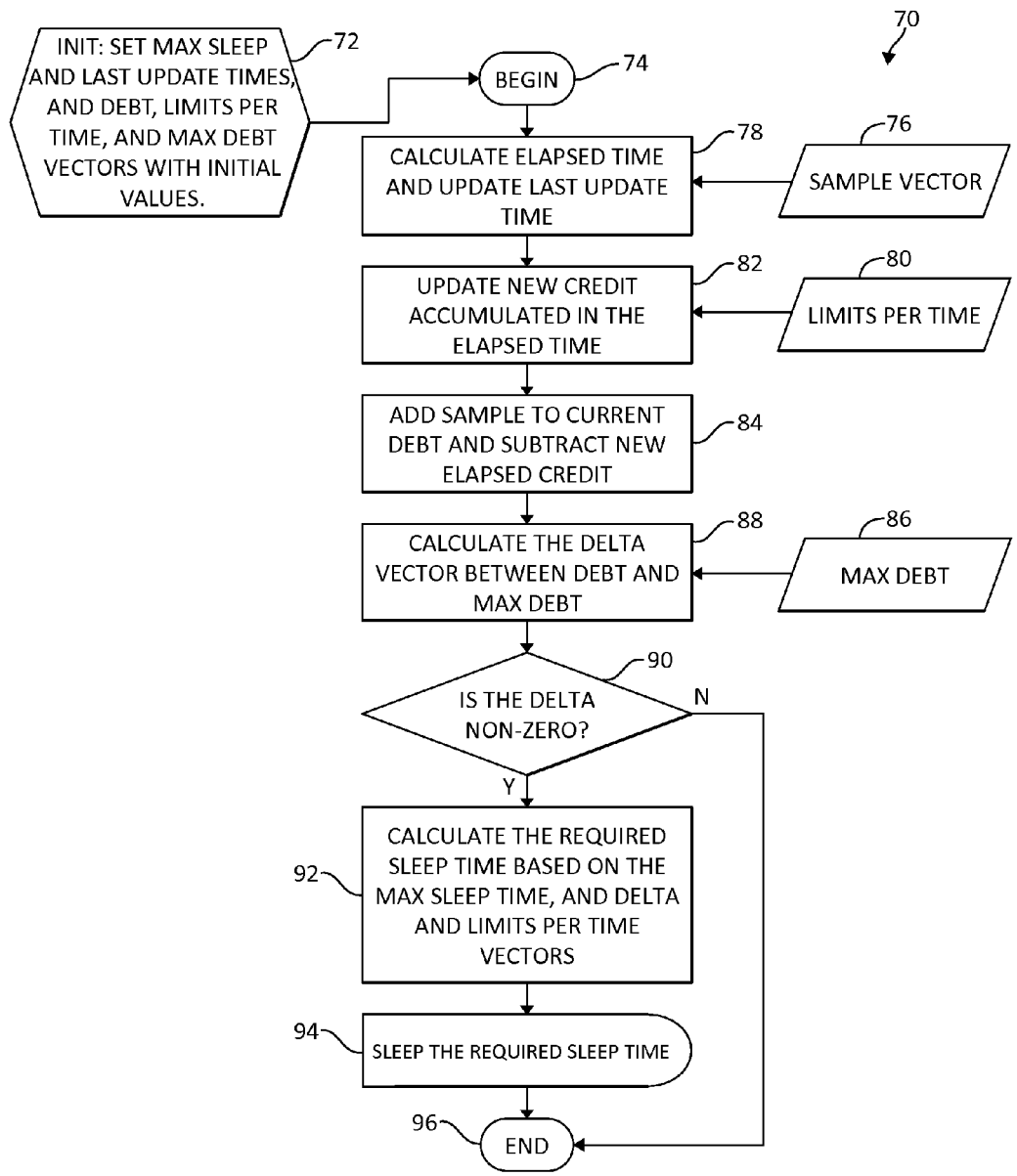
FIG. 3 illustrates an exemplary method for deduplicated data processing rate control.

Turning now to FIG. 3, a method 70 for deduplicated data processing rate control for one or more workers processing chunks of deduplicated data is illustrated. In one embodiment, method 70 may be implemented using deduplication system 30 (FIGS. 1 and 2) components, or various other processing, networking, and storage components in computing environments. As one skilled in the art will appreciate, various steps in the method 70 may be implemented in differing ways to suit a particular application. In addition, the described method may be implemented by various means, such as hardware, software, firmware, or a combination thereof operational on or otherwise associated with the computing environment. For example, the method 70 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

Method 70 begins (step 74) with the completion of an initialization process (step 72). As part of this initialization, a maximum allowed sleep time is set to S. This value is defined since the mechanisms utilize delays using sleep. However, S may also be infinite. Initial values for a last update time ($t_0$) and a current debt vector (D) are also set. Limits per time unit and maximum debt (max debt) vectors are set to L and A accordingly. In light of initialization step 72, note that all time measurements are normalized to a single, common time unit. In one embodiment, for example, all time measurements are normalized to the time unit that is the least common denominator for all limit dimensions. In addition, the current debt vector is initialized with large values in order to avoid an initial peak behavior. This peak behavior occurs due to a discontinuity at beginning of runtime.

As a following step, the current system time value is retrieved. In one embodiment, a function is assumed that retrieves the current time, such as GetCurrentTime( ) pursuant to a sample vector (block 76). Using this function, an elapsed time since the last update time may be calculated, and the last update time may then be updated (step 78). Any new credit accumulated in the elapsed time since the last update time is updated (step 82) pursuant to the constraints of the limits per time vector (block 80). In one embodiment, to facilitate step 82, a function such as GetCurrentRateLimitsPerTime( ) may be assumed that retrieves the limits per time unit vector and max debt vectors relevant to this point in time. The limits per time unit and max debt vectors may be determined pursuant to an environment external to the mechanisms of the present invention. For example, the external environment may define various criteria in view of factors such as a changing system load and/or user intervention. These factors may serve to determine a variety of differing limits.

As a following step, the sample vector is added to the current debt vector, and the previously calculated elapsed credit is subtracted from the result to achieve the updated debt vector of the processing system (step 84). This subtraction is implemented as described previously, such that it leaves the result non-negative (i.e., each negative value in the resulting vector is reset to zero). The current max debt (block 86) is subtracted from the current debt, and the result is saved in a delta vector (step 88). If the delta is a zero vector (decision 90), then the method 70 ends (step 96), as no leftover debt is calculated that would necessitate a processing delay, as will be further described.

If however, the delta is non-zero (i.e., an amount of debt is calculated necessitating system delay) (again, decision 90), then the method 70 calculates the required delay (e.g., sleep time) (step 92). If the previously calculated delta is non-zero, this indicates that leftover debt due to the new sample exists (despite the elapsed credit), so the particular worker should be delayed. In view of decision 90, it should be noted that, in one embodiment, the sleep time may be calculated by taking a maximum sleep time calculated for each limit dimension. By taking a maximum value, the method ensures a "best-fit" delay according to the leftover debt. The delay may be then checked against the max sleep time set at initialization (again, step 72) and reduced accordingly.

Once the required sleep time is calculated, then a function such as Sleep( ) may be implemented to delay a worker by a certain value of sleepTime, and thus, adjust the system's data-flow rate according to the specified limits (step 94). In other words the Sleep( ) function enables, to prevent data processing until the limits are satisfied. The method then ends (step 96). Note that the entire method 70 (except for the Sleep( ) function) may be adapted to be operable in mutual exclusion. This is due to the parallel operating characteristics of workers. Without this mutual exclusion, the workers could have overridden the parameters to one another, leading to possible negative effects on the rate control.

Figure 4:
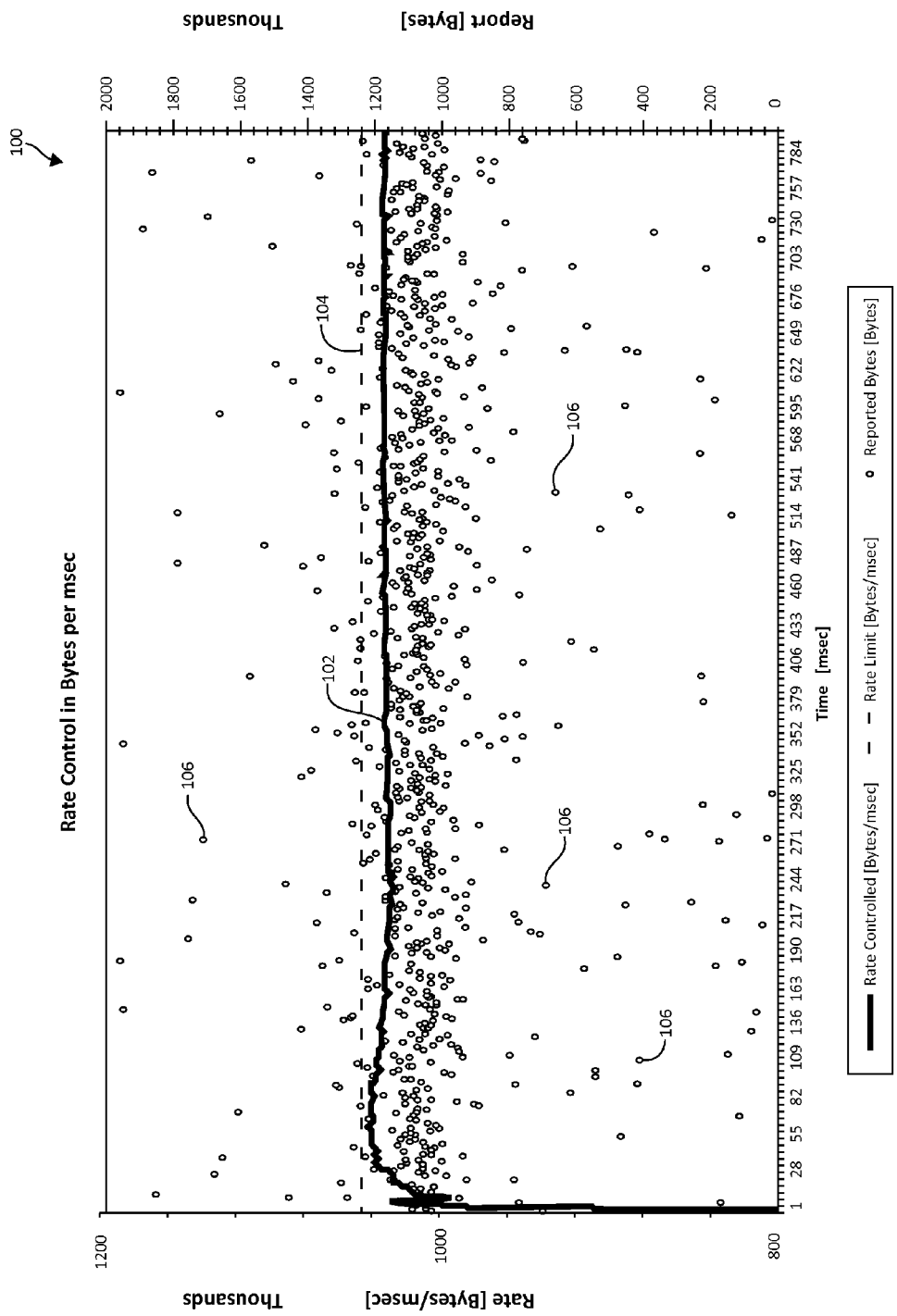
FIG. 4 illustrates an exemplary deduplicated data processing rate control.

Turning now to FIG. 4, following, a first exemplary graph 100 of deduplicated data processing rate control is illustrated. Graph 100 depicts an exemplary implementation of method 70 (FIG. 3) with an accompanying single dimensional rate limit of 1 MB/ms. In the illustrated example, a parallel environment is configured with eight (8) workers. Each worker reports one hundred (100) chunks of some deduplicated data processing (in Bytes). As observed, after an initial adaptation, the mechanisms of the present invention adjust the overall system rate to be closely limited by the given limit (as seen by the correlation of the dotted line representing the rate limit, and the solid line representing the rate controlled). Note, in the illustrated example, the max debt was configured to be 16 MB.

Figure 5:
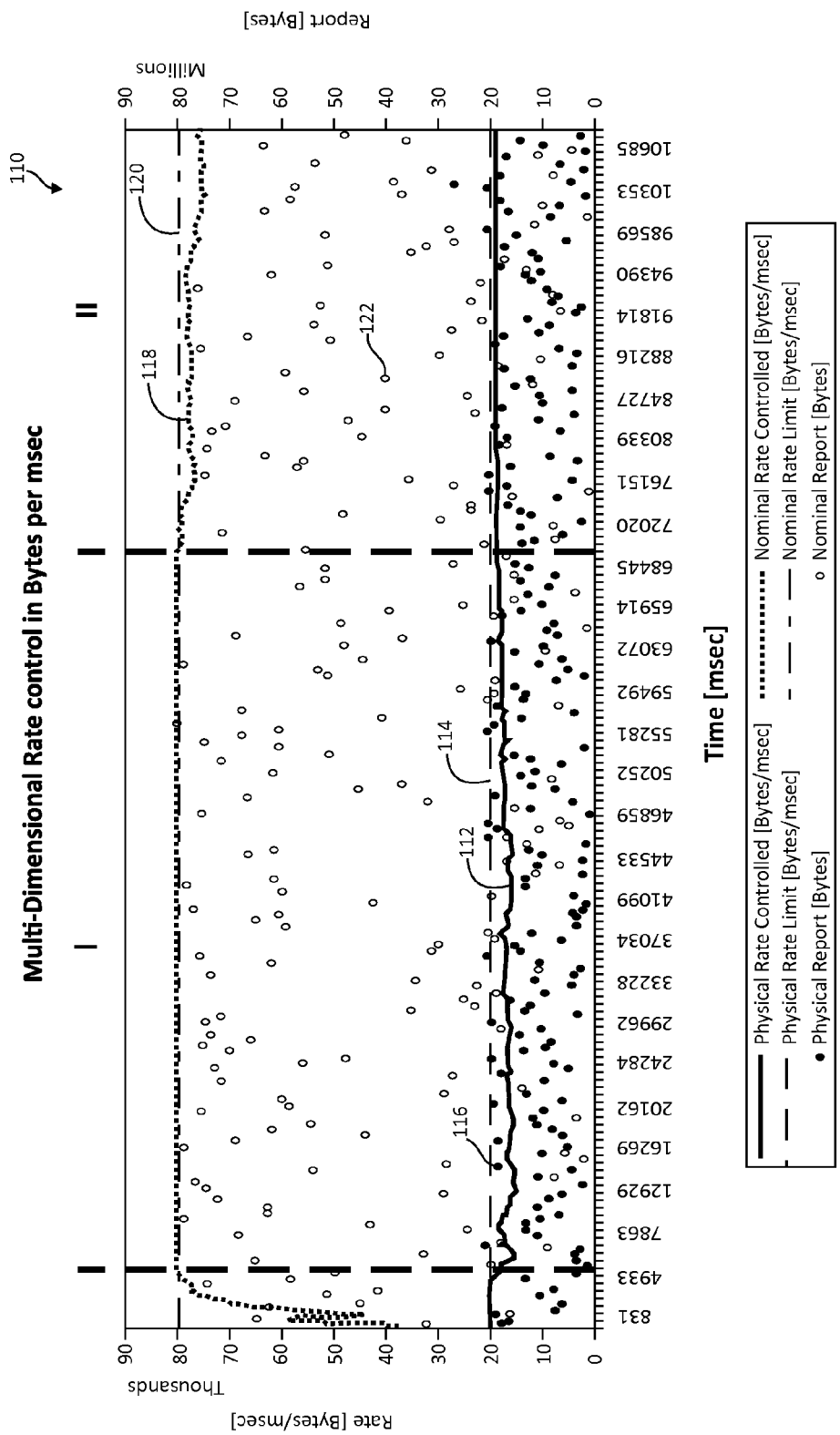
FIG. 5 illustrates an exemplary multidimensional deduplicated data processing rate control.

An additional example of implementing method 70 (again, FIG. 3), but with multiple dimensional rate limits is illustrated in FIG. 5, following, by graph 110. In the illustrated example, a parallel environment is configured, again with eight (8) workers, each reporting 25 chunks of some deduplicated data processing in two dimensions including nominal and physical representations in Bytes. In this case, the physical rate limit is set to 20 KB/msec, while the nominal rate limit is set to 80 KB/msec. In contrast to the physical representations, the nominal rate limits are taken as 20 MB and 80 MB, respectively. Note the two horizontal segments of the graph 100 denoted as segments (I) and (II), respectively, separated with vertical dotted lines. In segment (I), the system's rate limit is controlled using the nominal dimension. Note that the physical rate does not require adjustments and is left untouched. In the segment (II), the opposite occurs, and the rate control mechanisms use the physical dimension to limit the workers.

Finally, turning to FIG. 6, following, exemplary pseudo code of an exemplary implementation of deduplicated data processing rate control mechanisms is shown. The skilled artisan will appreciate that various portions of the pseudo code follow the methodologies previously described in FIG. 3. For example, lines 3-4 relate to the initialization step previously described, lines 7-9 relate to the calculation of the elapsed time and the updating of the last update time, lines 12-13 relate to the update of the new credit accumulated in the elapsed time, line 16 relates to the process of adding the sample to the current debt and subtraction of the new elapsed credit, and lines 19-29 relate to the calculation of the delta vector, the determination of whether the vector is non zero, and the implementation of a delay pursuant to the calculation of the minimum sleep time. Here again, the skilled artisan will appreciate that the pseudo code in FIG. 6 may vary depending on a particular implementation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for deduplicated data processing rate control using at least one processor device in a computing environment, the method comprising:
configuring a plurality of workers for parallel processing of deduplicated data entities in a plurality of chunks; and
regulating a deduplicated data processing rate using a rate control mechanism, the rate control mechanism incorporating a debt/credit algorithm specifying which of the plurality of workers processing the deduplicated data entities must wait for each of a plurality of calculated required sleep times.

2. The method of claim 1, wherein the rate control mechanism is adapted to limit a data flow rate based on a penalty acquired during a last processing of one of the plurality of chunks in a retroactive manner, and further adapted to operate on at least one vector representation of at least one limit specification to accommodate a variety of available dimensions corresponding to the at least one limit specification.

3. The method of claim 1, further including defining the at least one vector representation to represent the variety of available dimensions corresponding to the at least one limit specification.

4. The method of claim 3, further including, pursuant to defining the at least one vector representation, defining a plurality of vector operations for the at least one vector representation including addition, subtraction, equality, and assignment vector operations, wherein the subtraction vector operation is defined to reset to a zero value when subtracted below zero.

5. The method of claim 4, further including, pursuant to defining the at least one vector representation, defining a zero vector for evaluating a non-zero delta vector of the at least one vector representation.

6. The method of claim 5, further including, pursuant to defining the at least one vector representation, using the at least one vector representation to define a limits per time unit vector, wherein the variety of available dimensions are commonly measured in a per time unit corresponding to the limits per time unit vector.

7. The method of claim 6, further including initializing the rate control mechanism by performing at least one of:
setting a maximum allowable sleep time to one of a predefined finite value and a predefined infinite value, and
setting initial values for a last update time, a current debt vector, a limits per time vector, and a maximum debt vector.

8. The method of claim 7, further including, pursuant to regulating the deduplicated data processing rate, performing at least one of:
retrieving a current system time value,
generating a sample vector as the at least one vector representation for the current system time value,
using the current system time value, calculating an elapsed time credit since the last update time, and
updating the last update time.

9. The method of claim 8, further including, pursuant to regulating the deduplicated data processing rate, performing at least one of:
adding the sample vector to the current debt vector and subtracting the elapsed time credit to obtain an updated debt vector,
subtracting the maximum debt vector from the current debt vector to obtain a delta vector.

10. The method of claim 9, further including, pursuant to regulating the deduplicated data processing rate, if the delta vector is non-zero,
calculating a required sleep time as a best fit between the maximum allowable sleep time, the delta vector, and the limit per time vector, wherein the required sleep time is one of the plurality of calculated required sleep times.

11. The method of claim 10, further including refraining from processing the deduplicated data entities pursuant to the required sleep time.

* * * * *